United States Patent
Minatani (10) Patent No.: US 7,259,948 B2
(45) Date of Patent: Aug. 21, 2007

(54) POWER SUPPLY DEVICE FOR DRIVING

(75) Inventor: Yoshihiko Minatani, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 537 days.

(21) Appl. No.: 10/627,878

(22) Filed: Jul. 28, 2003

(65) Prior Publication Data

US 2004/0027757 A1    Feb. 12, 2004

(30) Foreign Application Priority Data

Aug. 9, 2002    (JP)    ............................. 2002-234164

(51) Int. Cl.
*H02H 7/00* (2006.01)
*H02H 7/122* (2006.01)

(52) U.S. Cl. ...................... 361/91.1; 361/18; 363/53.11

(58) Field of Classification Search .................. 361/18, 361/91.1, 111; 363/21.12, 56.11
See application file for complete search history.

(56) References Cited

U.S. PATENT DOCUMENTS

| | | | | |
|---|---|---|---|---|
| 4,263,643 A | * | 4/1981 | Koike | 363/19 |
| 4,685,020 A | * | 8/1987 | Driscoll et al. | 361/18 |
| 4,809,151 A | * | 2/1989 | Ota | 363/21.18 |
| 4,868,729 A | * | 9/1989 | Suzuki | 363/21.15 |
| 5,325,282 A | * | 6/1994 | Bansard | 363/21.13 |
| 5,381,294 A | * | 1/1995 | Konishi | 361/18 |
| 5,694,305 A | * | 12/1997 | King et al. | 363/21.11 |
| 5,712,540 A | * | 1/1998 | Toda et al. | 318/46 |
| 5,818,670 A | * | 10/1998 | Ahn | 361/18 |
| 5,862,044 A | * | 1/1999 | Shioya et al. | 363/21.07 |
| 5,914,865 A | * | 6/1999 | Barbehenn et al. | 363/21.15 |
| 5,929,665 A | * | 7/1999 | Ichikawa et al. | 327/109 |
| 6,408,148 B1 | * | 6/2002 | Yamamoto | 399/88 |
| 7,023,679 B2 | * | 4/2006 | Tomiyama | 361/91.1 |
| 2003/0174523 A1 | * | 9/2003 | Minatani | 363/50 |

FOREIGN PATENT DOCUMENTS

| | | | |
|---|---|---|---|
| JP | 07095724 A | * | 4/1995 |
| JP | A 2001-268909 | | 9/2001 |
| JP | A-2001-320875 | | 11/2001 |
| JP | A 2002-135967 | | 5/2002 |

* cited by examiner

Primary Examiner—Stephen W. Jackson
Assistant Examiner—Danny Nguyen
(74) Attorney, Agent, or Firm—Oliff & Berridge, PLC (57) ABSTRACT

A power supply device for driving has a switching control circuit that switches a switching element for a power source, and an output voltage generation portion that generates a predetermined output voltage in accordance with the switching of the switching element for the power source. In addition, the output voltage generation portion includes an overvoltage detection circuit that detects an overvoltage. Furthermore, the switching control circuit includes an output voltage suppression processing unit that suppresses an increase in the output voltage when the overvoltage is detected. In this case, if the overvoltage is detected, the output voltage suppression processing unit suppresses an increase in the output voltage. In the period of time until an operation of a power supply circuit portion being stopped, the output voltage does not exceed a gate withstand voltage of a power element.

9 Claims, 7 Drawing Sheets

POWER SUPPLY DEVICE FOR DRIVING

INCORPORATION BY REFERENCE

The disclosure of Japanese Patent Application No. 2002-234164 filed on Aug. 9, 2002 including the specification, drawings and abstract are incorporated herein by reference in its entirety.

BACKGROUND OF THE INVENTION

1. Field of Invention

The invention relates to a power supply device for driving.

2. Description of Related Art

Conventionally, an electric vehicle, for example, an electric automobile, is equipped with a drive device. In the drive device, revolutions that are generated by the driving of a drive motor are transferred to a drive wheel, causing the electric automobile to run. Furthermore, for example, in the drive device of a hybrid-type vehicle, an engine and a generator are provided as well as the drive motor. Power is generated by the generator through the driving of the engine, and the power that is generated thereby can be stored in a battery.

For example, the drive motor has a rotor, which is provided so as to be rotatable and includes a pair of magnetic poles, and a stator, which is provided outwardly in a radial direction from the rotor and includes a U-phase coil, a V-phase coil and a W-phase coil. In addition, the drive motor is driven by the supply of U-phase current, V-phase current and W-phase current to each coil, enabling the generation of torque from the drive motor, in other words, drive motor torque.

For this purpose, the battery and an inverter are connected, and direct current is supplied from the battery to the inverter. The inverter is structured with a plurality of transistors as power elements, which are switched in a predetermined pattern based on a pulse width modulation signal generated by a drive motor control device, causing current of each of the phases to be generated. In addition, a power supply device for driving is provided in order to generate a required voltage for switching each of the transistors. A power supply circuit portion is connected to the inverter in the power supply device for driving, and U-phase, V-phase and W-phase voltage that is generated in the power supply circuit portion is supplied to the inverter.

Note that FETs may be used for the transistors in the inverter, and three IGBTs that constitute transistor modules may also be used. Furthermore, an IPM (intelligent power module), where the inverter and a drive circuit are integrally formed, may be used. When FETs or IGBTs are used, each FET or each IGBT constitutes a power element.

Figure 2:
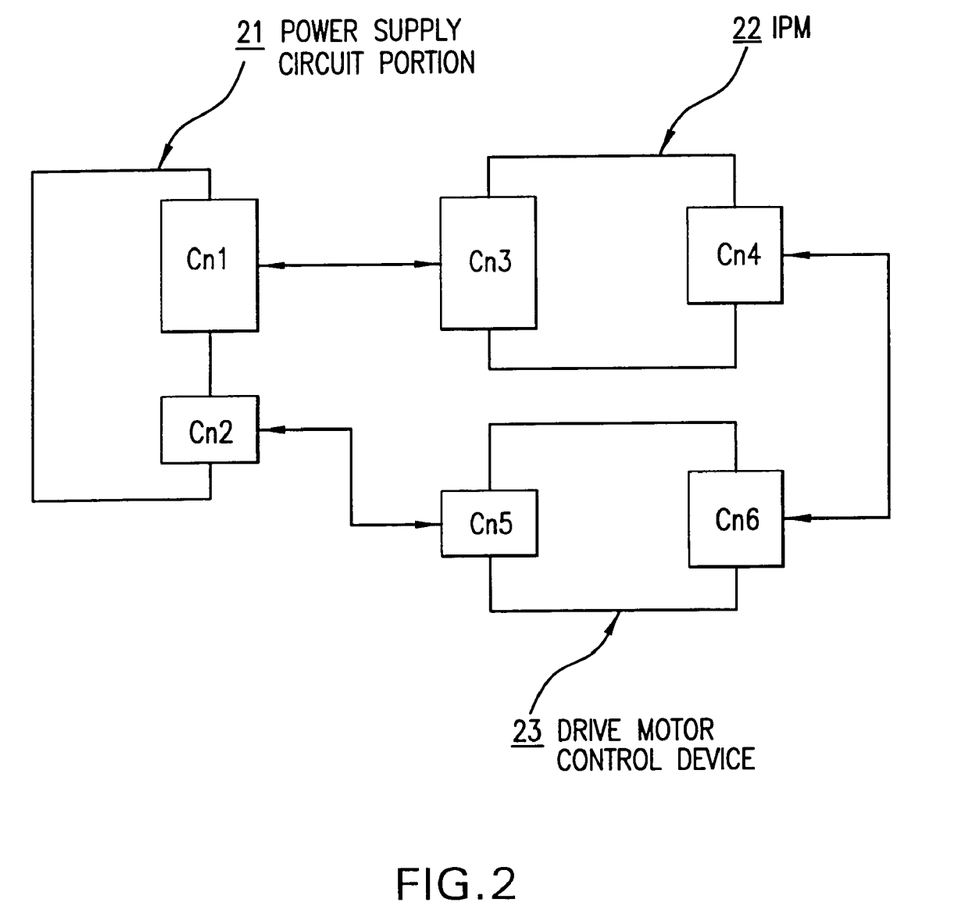
FIG. 2 is a diagram showing a power supply device for driving.

FIG. 2 is a diagram of a power supply device for driving. In the diagram, reference numeral 21 denotes a power supply circuit portion. Reference numeral 22 denotes an IPM that includes an inverter (not shown in the diagram) for driving a drive motor (not shown in the diagram), and a drive circuit (not shown in the diagram). Reference numeral 23 denotes a drive motor control device that controls the drive motor. Connectors Cn1 and Cn2 are provided in the power supply circuit portion 21, connectors Cn3 and Cn4 are provided in the IPM 22, and connectors Cn5 and Cn6 are provided in the drive motor control device 23.

Note that, in accordance with an ignition (IG) switch (not shown in the diagram) being switched ON, a voltage from a battery (not shown in the diagram), which is a power supply voltage for auxiliary equipment, is supplied as an ignition voltage to the power supply circuit portion 21 through the drive motor control device 23. In addition, the power supply circuit portion 21 is provided with items, such as a transformer (not shown in the diagram) for generating a +15 (V) base voltage based on the ignition voltage, and, on the primary side of the transformer, a FET that interrupts a current and generates a predetermined primary current as a switching element for a power supply, and a switching control circuit (not shown in the diagram) that generates a duty signal, sends the duty signal to the FET, causing the FET to be switched, and, on the secondary side of the transformer, phase power supply circuits for each phase, namely a U-phase power supply circuit, a V-phase power supply circuit, a W-phase power supply circuit, an X-phase power supply circuit, a Y-phase power supply circuit, and a Z-phase power supply circuit, that generate a +15 (V) voltage of each phase in accordance with the switching of the FET, and a feedback circuit that is provided on the primary side in order to, in accordance with the +15 (V) voltages of each phase that are generated on the secondary side, feedback those voltages.

If, for example an abnormality is generated in the switching control circuit, the feedback circuit or the like in the power supply circuit portion 21, causing the generation of a surplus voltage, in other words, an overvoltage, then an overvoltage detection circuit that is provided in each phase power supply circuit detects the overvoltage, generates a detection signal and sends it to a fail detection circuit. If the detection signal is sent to the fail detection circuit, an interface circuit makes a READY signal low level and sends it to the drive motor control device 23. In addition, if the drive motor control device 23 judges that the READY signal is low level, a circuit that supplies the ignition voltage to the power supply circuit portion 21 is cut off, causing operation of the power supply circuit portion 21 to stop.

In this conventional power supply device for driving, however, in the period of time between the overvoltage detection circuit detecting the overvoltage, and the operation of the power supply circuit 21 being caused to stop, it is possible that the IPM 22, more specifically items such as a transistor, a drive circuit or the like (not shown in the diagram) of the IPM 22, may fracture.

SUMMARY OF THE INVENTION

The invention is contrived in view of the foregoing problem of a conventional power supply device for driving. It is an object of the invention to provide a power supply device for driving that can prevent fracture of a power element when an overvoltage is generated.

For this purpose, the power supply device for driving according to an aspect of the invention has a switching control circuit on the primary side of a transformer, which carries out switching of a switching element for a power supply, and an output voltage generation portion on the secondary side of the transformer, which generates a predetermined output voltage in accordance with the switching of the switching element for the power supply.

In addition, the output voltage generation portion includes an overvoltage detection circuit to detect an overvoltage. Furthermore, the switching control circuit includes an output voltage suppression processing unit that suppresses an increase in the output voltage when the overvoltage is detected.

In this case, if the overvoltage is generated in the output voltage generation portion and is detected by the overvoltage detection circuit, the output voltage suppression processing unit suppresses an increase in the output voltage. Therefore, since the output voltage does not become higher than an overvoltage detection level and does not exceed a gate withstand voltage of the power element in the period of time between the overvoltage detection circuit detecting the overvoltage and operation of a power supply circuit portion being stopped, fracturing of the power element can be prevented.

The power supply device for driving may also be structured such that the output voltage generation portion includes a plurality of phase power supply circuits that generate an output voltage of a plurality of phases. Furthermore, the overvoltage detection circuit is provided in the power supply circuit of each phase.

The power supply device for driving may also be structured such that the switching control circuit includes a duty control portion that switches the switching element for the power supply according to a predetermined duty signal. In addition, the output voltage suppression processing unit, which is provided in the duty control portion, carries out control such that the duty ratio of the duty signal becomes smaller when an overvoltage is detected.

The power supply device for driving may also be structured such that an overvoltage signal generation portion is provided, which generates an overvoltage signal when the overvoltage is detected and sends that voltage signal to the switching control circuit.

BRIEF DESCRIPTION OF THE DRAWINGS

The invention will be described with reference to the drawings, in which.

DETAILED DESCRIPTION OF PREFERRED EMBODIMENTS

Figure 3:
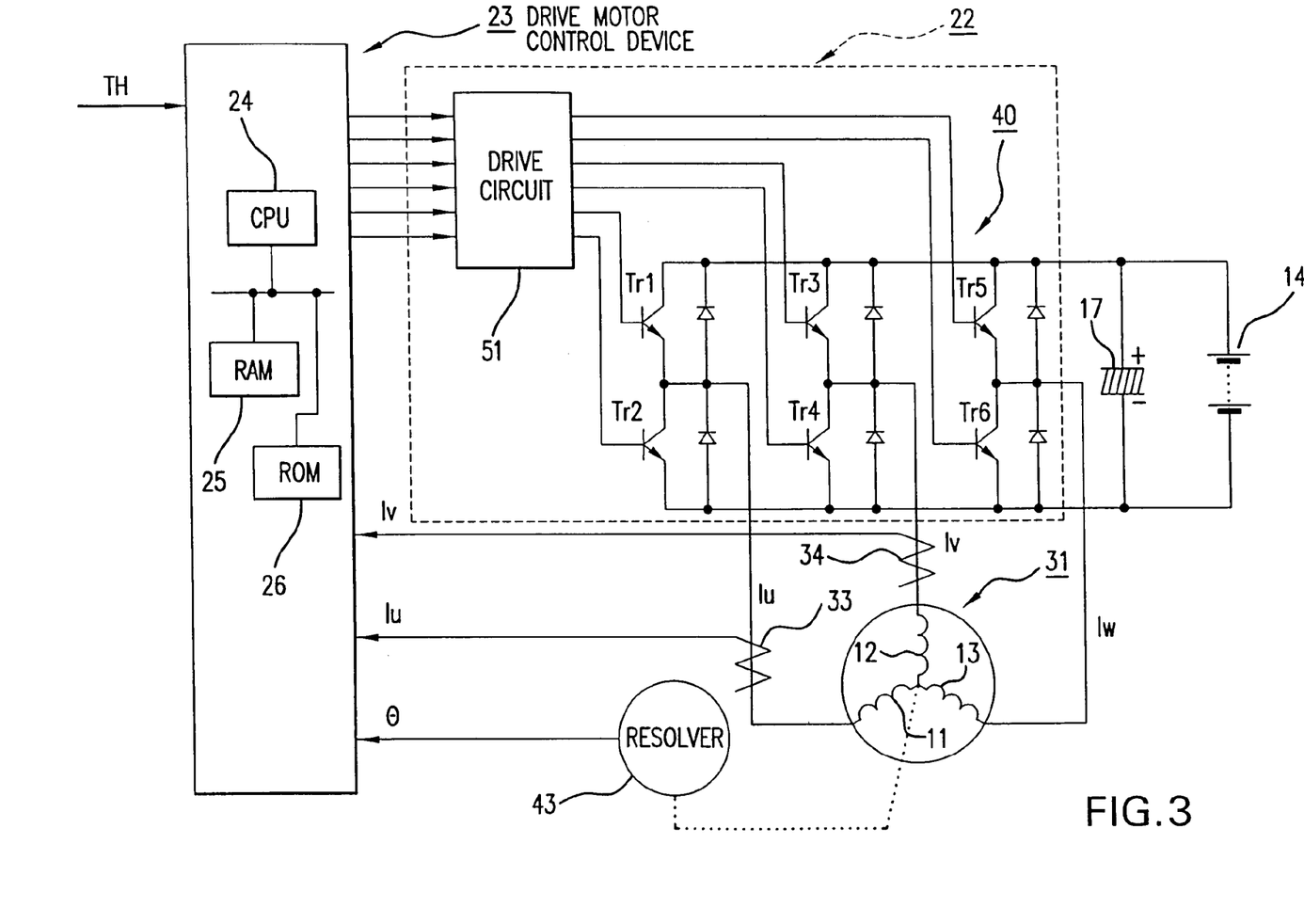
FIG. 3 is a control circuit diagram of an electric vehicle drive control device according to the first embodiment of the invention.

FIG. 3 is a control circuit diagram of an electric vehicle drive control device according to the first embodiment of the invention. In the diagram, reference numeral 22 denotes an IPM. Reference numeral 23 denotes a drive motor control device that functions as a computer according to various programs, data and the like. Reference numeral 31 denotes a drive motor, such as a DC brushless drive motor that serves as an electric machine. The IPM 22 includes an inverter 40 and a drive circuit 51. The drive motor 31 includes a rotatable rotor (not shown in the diagram) and a stator that is provided outwardly in a radial direction from the rotor.

The rotor includes a rotor core that is attached to a shaft (not shown in the diagram) of the drive motor 31, and permanent magnets that are provided in a plurality of locations in a circumferential direction of the rotor core. According to this embodiment of the invention, the permanent magnets are provided in 12 locations in a circumferential direction of the rotor core with the N-poles and S-poles oriented alternately toward an outer peripheral surface, forming six magnetic pole pairs. Furthermore, the stator includes a stator core (not shown in the diagram), and U-phase, V-phase and W-phase stator coils 11, 12, 13 that are wound around the stator core. The stator protrudes inwardly in a radial direction in a plurality of locations in a circumferential direction of the stator core, forming teeth.

A battery 14, that serves as a direct current power supply for driving, the inverter 40 and the drive circuit 51 are provided in order to drive the drive motor 31 and cause an electric vehicle, such as an electric automobile or a hybrid-type vehicle to run. The inverter 40 is supplied with direct current from the battery 14 and converts that direct current into alternating current, generating U-phase, V-phase and W-phase currents Iu, Iv and Iw. The drive circuit 51 receives a pulse width modulation signal from the drive motor control device 23 and generates a drive signal, and then sends that drive signal to the inverter 40. In addition, the currents Iu, Iv and Iw generated by the inverter 40 are supplied to the stator coils 11, 12, 13, respectively.

For this purpose, the inverter 40 includes transistors Tr1 to Tr6 as six power elements. The currents Iu, Iv and Iw are generated by each of the transistors Tr1 to Tr6 being switched and set selectively to ON or OFF. Note that a condenser 17 for smoothing is provided between the IPM 22 and the battery 14, and a load corresponding to a capacitance is stored in the condenser 17.

Furthermore, a resolver 43, which serves as a magnetic pole position detection portion, is attached to a shaft of the drive motor 31. A magnetic pole position θ of the rotor is detected by the resolver 43. Note that according to this embodiment of the invention, the resolver 43 is used as the magnetic pole position detection portion, but a Hall element and a magnetic pole position detection circuit (not shown in the diagram) may be used instead of the resolver 43. In such a case, the Hall element generates a position detection signal at each predetermined angle in accordance with rotation of the rotor, and the magnetic pole position detection circuit detects the magnetic pole position θ based on a combination of signal levels of the position detection signal, once the position detection signal is received.

Moreover, although according to this embodiment of the invention, the IPM 22 is used where the inverter 40 and the drive circuit 51 are integrally formed, in the case where an inverter and a drive circuit are provided independently, FETs or three IGBTs, that constitute transistor modules, may be used as each of the transistors Tr1 to Tr6 in the inverter. In this case, the IGBTs constitute a transistor module including transistors Tr1, Tr2, a transistor module including transistors Tr3, Tr4, and a transistor module including transistors Tr5, Tr6.

In addition, according to this embodiment of the invention, the IPM 22, or each FET in the inverter 40 if FETs are used, or each IGBT in the inverter 40 if IGBTs are used, constitute power elements.

Note that, because the stator coils 11 to 13 are star-connected, if the value of the current of two of the three phases is determined, then the value of the current of the remaining phase is also determined. Therefore, in order to control the currents Iu, Iv and Iw, for example, current sensors 33, 34 are provided in the lead wiring of the stator coils 11, 12 as current detection units for detecting the U-phase and V-phase currents Iu, Iv, and the current sensors 33, 34 send the detected currents Iu, Iv to the drive motor control device 23.

In addition, the drive motor control device 23 includes a CPU 24, a RAM 25, a ROM 26, and the like. A drive motor rotation speed calculation processing unit (not shown in the diagram) of the CPU 24 carries out drive motor rotation speed calculation processing, and calculates the rotation speed of the drive motor 31, in other words a drive motor rotation speed NM, based on the magnetic pole position θ. Furthermore, a vehicle speed detection processing unit (not shown in the diagram) of the CPU 24 carries out vehicle speed detection processing, detects a vehicle speed V corresponding to the drive motor rotation speed NM, and sends the detected vehicle speed V to a vehicle control device (not shown in the diagram) that carries out overall control of the electric vehicle.

A command value generation portion of the vehicle control device calculates a vehicle requirement torque that is necessary to cause the electric vehicle to run, based on the vehicle speed V and an accelerator angle α detected by an accelerator sensor (not shown in the diagram), generates a drive motor target torque TM*, which indicates a target value for a drive motor torque TM corresponding to the vehicle requirement torque, and sends the drive motor target torque TM* to the drive motor control device 23.

A drive motor control processing unit (not shown in the diagram) of the CPU 24 carries out drive motor control processing and, once it reads the drive motor target torque TM*, refers to a current command value map (not shown in the diagram) recorded in the ROM 26, determines a d-axis current command value Ids and a q-axis current command value Iqs that indicate a d-axis component and a q-axis component of a current command value Is, indicated as a vector. The drive motor control processing unit of the CPU 24 also reads the currents Iu, Iv, and calculates U-phase, V-phase and W-phase voltage command values Vu*, Vv*, Vw* based on the d-axis current command value Ids, the q-axis current command value Iqs, and the currents Iu, Iv, generates U-phase, V-phase and W-phase pulse width modulation signals SU, SV, SW, which have a predetermined pulse width based on the voltage command values Vu*, Vv*, Vw*, carries out a dead time compensation processing for the pulse width modulation signals SU, SV, SW to generate pulse width modulation signals SU, SV, SW, SX, SY, SZ, and sends the pulse width modulation signals SU, SV, SW, SX, SY, SZ to the IPM 22. Note that the pulse width modulation signals SU, SV, SW are generated corresponding to the transistors Tr1, Tr3, Tr5, and that pulse width modulation signals SX, SY, SZ are generated corresponding to the transistors Tr2, Tr4, Tr6.

The drive circuit 51, when it is sent the pulse width modulation signals SU, SV, SW, SX, SY, SZ, respectively generates six drive signals in order to drive the transistors Tr1 to Tr6, and sends the drive signals to the inverter 40. The inverter 40 sets the transistors Tr1 to Tr6 to ON only while the drive signals are ON, generates the currents Iu, Iv, Iw, and supplies the currents Iu, Iv, Iw to the stator coils 11, 12, 13, respectively. In this way, the electric vehicle is caused to run by the drive of the drive motor 31.

Note that feedback control is carried out in the drive motor control device 23 using vector control calculation on a d-q axis model, where the d-axis is plotted in the direction of the magnetic pole pairs of the rotor, and the q-axis is plotted in a right-angled direction to the d-axis.

For this purpose, three-phase/two-phase conversion is carried out in the CPU 24, based on the currents Iu, Iv detected by the current sensors 33, 34, and the magnetic pole position θ detected by the resolver 43, converting the currents Iu, Iv into a d-axis current Id and a q-axis current Iq. In addition, a d-axis current deviation Δid for the d-axis current Id and the d-axis current command value Ids, and a q-axis current deviation Δiq for the q-axis current Iq and the q-axis current command value Iqs are calculated, and a d-axis voltage command value Vd* and a q-axis voltage command value Vq* are generated as biaxial inverter outputs such that the d-axis current deviation Δid and the q-axis current deviation Δiq become zero (0).

Then, two-phase/three-phase conversion is carried out based on the d-axis voltage command value Vd*, the q-axis voltage command value Vq*, and the magnetic pole position θ, converting the d-axis voltage command value Vd* and the q-axis voltage command value Vq* into the U-phase, V-phase and W-phase voltage command values Vu*, Vv*, Vw*. The voltage command values Vu*, Vv*, Vw*, and the voltage of the battery 14 detected by a direct current voltage detector (not shown in the diagram), in other words the pulse width modulation signals SU, SV, SW, SX, SY, SZ of each phase based on a battery voltage VB, are generated.

Note that when the transistors Tr1, Tr3, Tr5 are ON only at a predetermined pulse width, the voltage for the drive signals of the transistors Tr1, Tr3, Tr5 is set to +15 (V) but, during this time, in order to set the transistors Tr2, Tr4, Tr6 to OFF, the voltage of the drive signal of the transistors Tr2, Tr4, Tr6 is set to 0 (V). In the same way, when the transistors Tr2, Tr4, Tr6 are ON only at a predetermined pulse width, the voltage for the drive signals of the transistors Tr2, Tr4, Tr6 is set to +15 (V) but, during this time, in order to set the transistors Tr1, Tr3, Tr5 to OFF, the voltage of the drive signal of the transistors Tr1, Tr3, Tr5 is set to 0 (V).

Here, a power supply circuit portion (not shown in the diagram) is provided in order to set the voltage for each drive signal to either +15 (V) or 0 (V). The +15 (V) U-phase, V-phase, W-phase, X-phase and Z-phase voltages are generated as predetermined drive voltages in the power supply circuit portion, and the +15 (V) voltage of each phase is enabled so as to be output with respect to the IPM 22. Note that in order to set the transistors Tr1 to Tr6 to OFF, the +15 (V) U-phase, V-phase, W-phase, X-phase, Y-phase and Z-phase voltages are converted to 0 (V) inside the IPM 22.

Because, according to this embodiment of the invention, the IPM 22 is used, and the IPM 22 is provided with the inverter 40 and the drive circuit 51, the distance between the drive circuit 51 and each of the transistors Tr1 to Tr6 is short. Therefore, each of the transistors Tr1 to Tr6 can be reliably set to OFF just by setting the voltage for each drive signal to 0 (V). In contrast to this, in a case where the IPM 22 is not used, as the inverter and the drive circuit are independently provided and wired, the distance between the drive circuit and each transistor is longer. When the IPM 22 is not used, therefore, the voltage for each drive signal is set to −15 (V) in order to reliably set each of the transistors Tr1 to Tr6 to OFF.

Furthermore, the power supply circuit portion, the IPM 22 and the drive motor control device 23 constitute a power supply device for driving. Hereafter, the power supply circuit portion will be explained.

Figure 1:
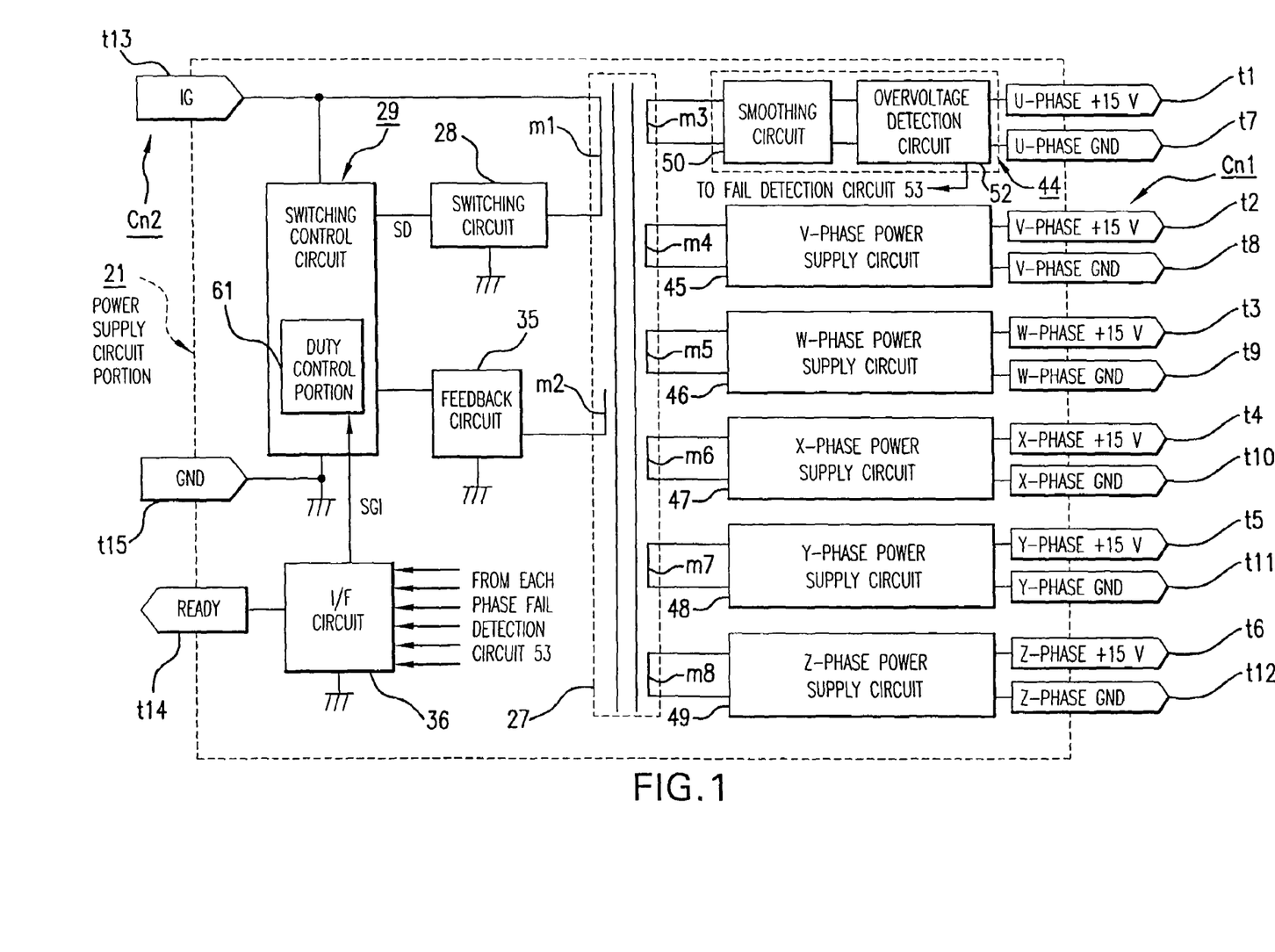
FIG. 1 is a block diagram of a power supply circuit portion according to a first embodiment of the invention.
Figure 4:
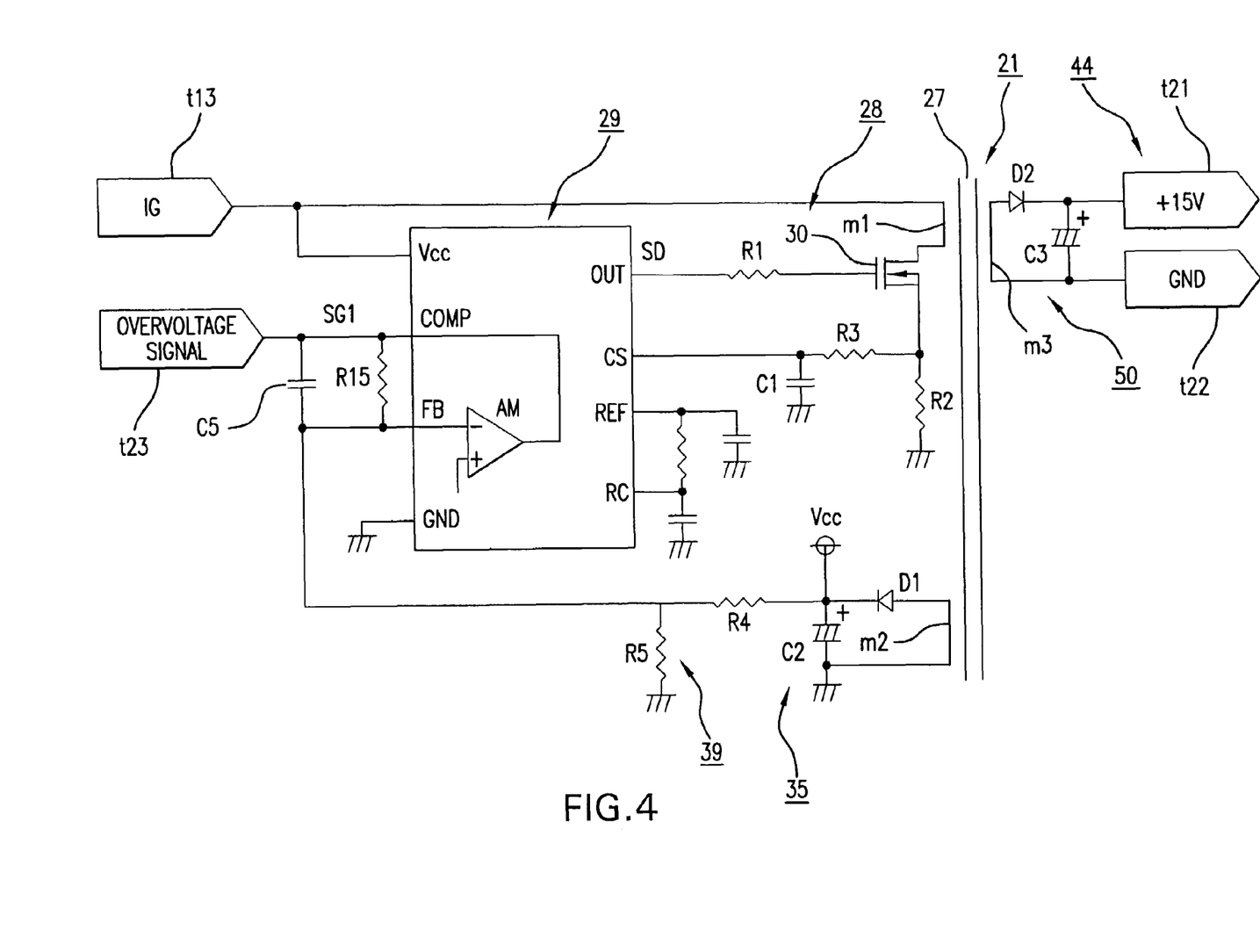
FIG. 4 is a first diagram showing a main part of the power supply circuit portion according to the first embodiment of the invention.
Figure 5:
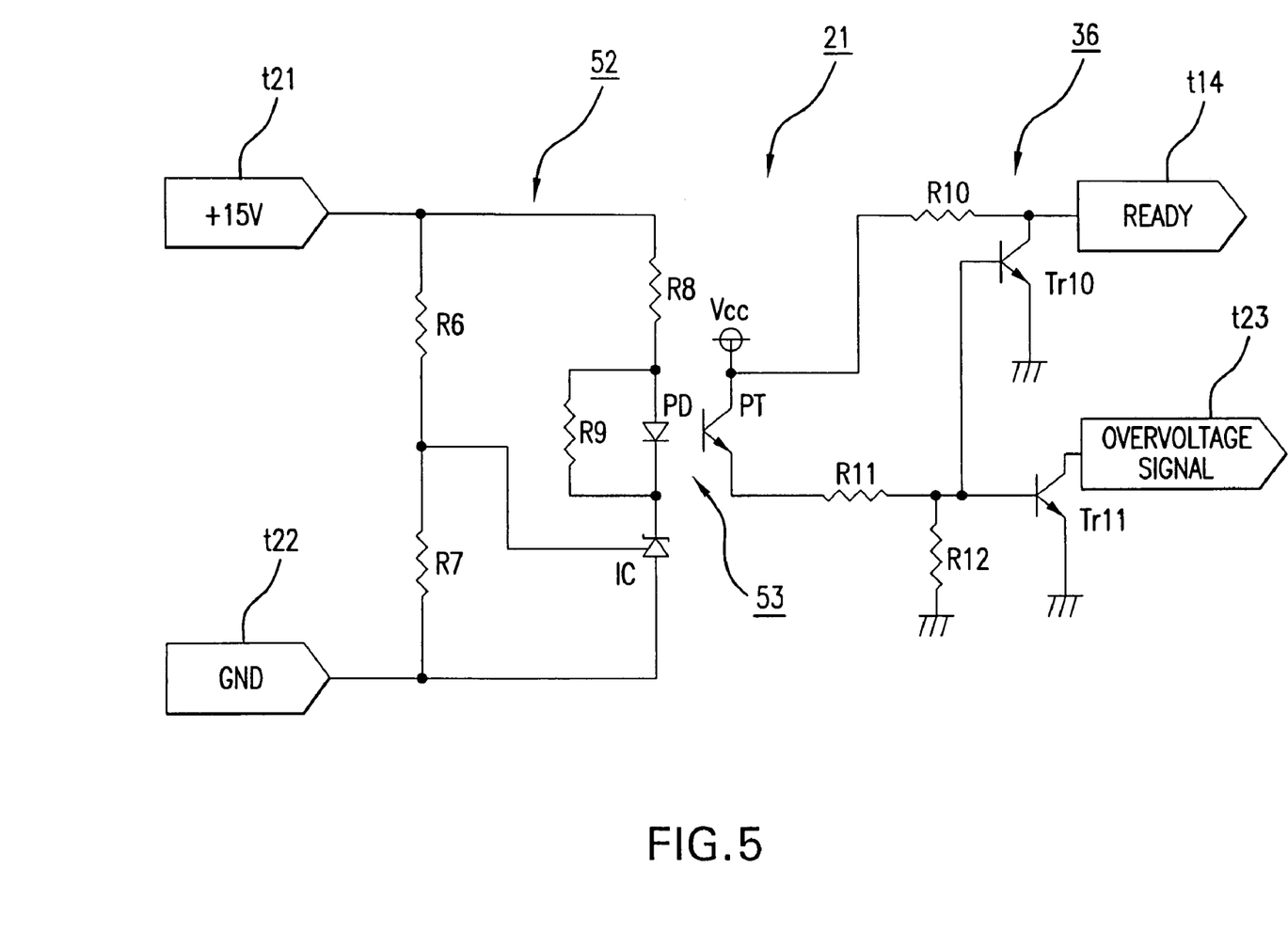
FIG. 5 is a second diagram showing a main part of the power supply circuit portion according to the first embodiment of the invention.
Figure 6:
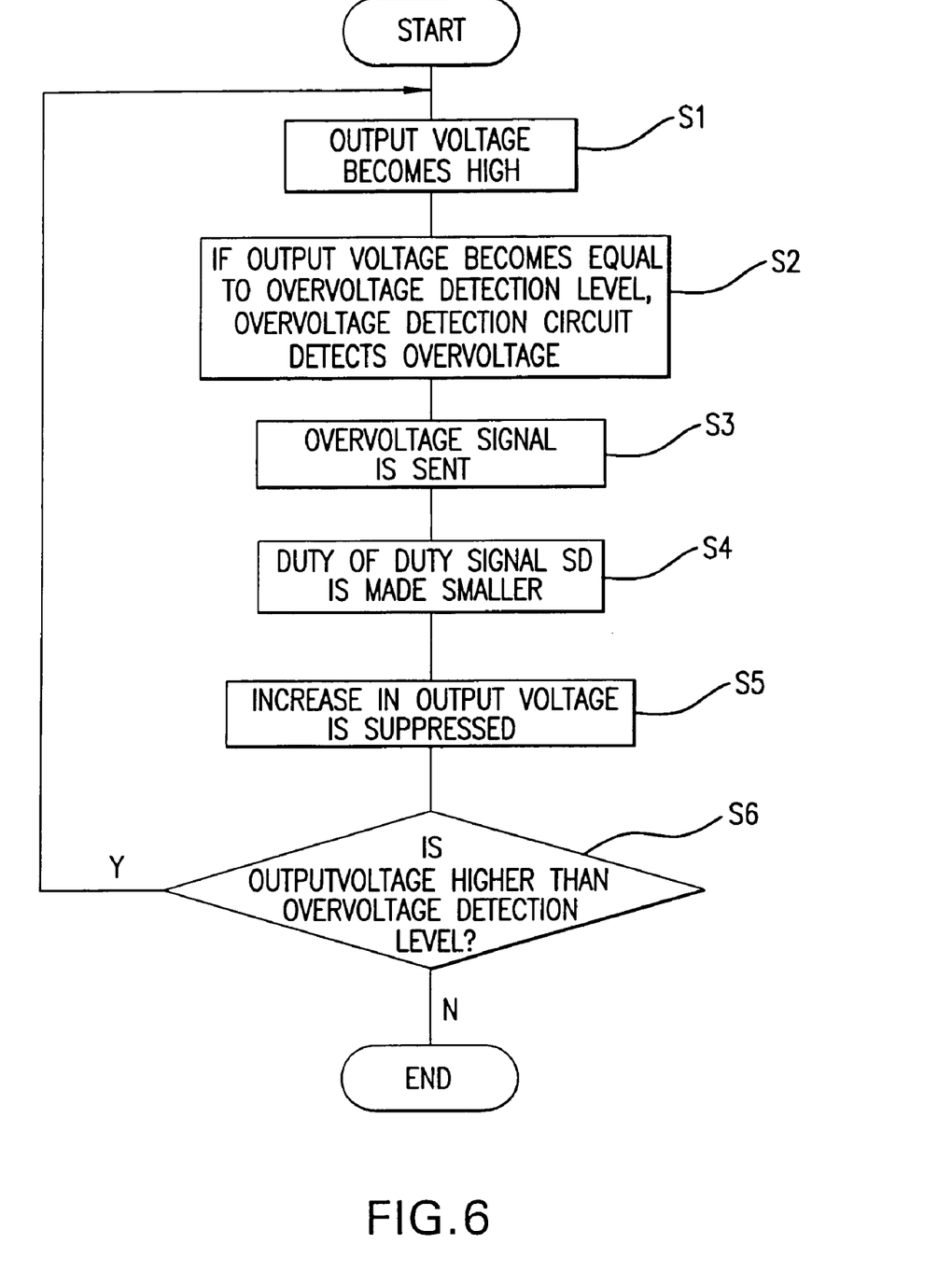
FIG. 6 is a flowchart showing an operation of the power supply circuit portion according to the first embodiment of the invention.

FIG. 1 is a block diagram of the power supply circuit portion according to the first embodiment of the invention. FIG. 4 is a first diagram showing a main part of the power supply circuit portion according to the first embodiment of the invention. FIG. 5 is a second diagram showing a main part of the power supply circuit portion according to the first embodiment of the invention. FIG. 6 is a flowchart showing an operation of the power supply circuit portion according to the first embodiment of the invention.

In the diagrams, reference number 21 denotes the power supply circuit portion, which is provided with connectors Cn1, Cn2. The connector Cn1 includes output terminals t1 to t6 for outputting U-phase, V-phase, W-phase, X-phase, Y-phase and Z-phase +15 (V) voltages, and ground (GND) terminals t7 to t12 for each phase. The connector Cn2 includes an input terminal t13 for receiving, as an ignition (IG) voltage, a voltage from a battery (not shown in the diagrams), which is a power supply voltage for auxiliary equipment, supplied from the drive motor control device 23 (see FIG. 3) in accordance with an ignition switch (not shown in the diagrams) being switched ON, an output terminal t14 for outputting a READY signal as a normal operation signal indicating that the power supply circuit portion 21 is operating normally, and a ground terminal t15 for grounding the power supply circuit portion 21. The READY signal becomes a high level when the power supply circuit portion 21 is operating normally, and becomes a low level when an abnormality is generated in the power supply circuit portion 21. Note that the ignition voltage indicates a signal with a higher voltage level than a normal READY signal.

Furthermore, the power supply circuit portion 21 has a transformer 27 for generating a +15 (V) base voltage based on the ignition voltage, and on a primary side of the transformer 27, a switching circuit 28 that includes a FET 30 that interrupts a current and generates a predetermined primary current as a switching element for a power supply, and a switching control circuit 29 that sends a duty signal SD to the switching circuit 28 causing the FET 30 to be switched, and, on the secondary side of the transformer 27, phase power supply circuits for each phase, namely a U-phase power supply circuit 44, a V-phase power supply circuit 45, a W-phase power supply circuit 46, an X-phase power supply circuit 47, a Y-phase power supply circuit 48, and a Z-phase power supply circuit 49 that generate a +15 (V) output voltage of each phase in accordance with the switching of the FET 30, a feedback circuit 35 that is provided on the primary side in order to, in accordance with the +15 (V) output voltages of each phase that are generated on the secondary side, feedback those output voltages, and an interface (I/F) circuit 36 that generates a READY signal. A duty control portion 61 of the switching control circuit 29 generates the duty signal SD as a switching signal. The phase power supply circuits of each phase, namely the U-phase power supply circuit 44, the V-phase power supply circuit 45, the W-phase power supply circuit 46, the X-phase power supply circuit 47, the Y-phase power supply circuit 48, and the Z-phase power supply circuit 49 constitute an output voltage generation portion. The transformer 27 includes primary side windings m1 and m2 on the primary side thereof, and secondary side windings m3 to m8 on the secondary side thereof.

Note that the output terminal ti and the ground terminal t7 are connected to the U-phase power supply circuit 44, the output terminal t2 and the ground terminal t8 are connected to the V-phase power supply circuit 45, the output terminal t3 and the ground terminal t9 are connected to the W-phase power supply circuit 46, the output terminal t4 and the ground terminal t10 are connected to the X-phase power supply circuit 47, the output terminal t5 and the ground terminal t11 are connected to the Y-phase power supply circuit 48, and the output terminal t6 and the ground terminal t12 are connected to the Z-phase power supply circuit 49. Furthermore, the output terminal t14 is connected to the interface circuit 36, and the READY signal is output to the drive motor control device 23 through the output terminal t14. The drive motor control device 23 is provided with a connector (not shown in the diagrams). The connector includes an input terminal for receiving the READY signal sent from the power supply circuit portion 21.

In addition, the switching circuit 28 includes the FET 30, and resistors R1, R2. In the FET 30, a drain is connected with the input terminal t13 through the primary winding m1, a gate is connected to an output terminal OUT of the switching control circuit 29 through the resistor R1, and a source is grounded through the resistor R2. When the switching signal SD is input to the gate, the FET 30 is caused to be switched ON or OFF, generating current. The current is sent to the primary winding m1 as the primary current.

Note that a set terminal CS of the switching control circuit 29 is connected between the FET 30 and the resistor R2, through a resistor R3. The set terminal CS side of the resistor R3 is grounded through a condenser C1.

Furthermore, the feedback circuit 35 includes a condenser C2 that is connected between a ground and a power supply Vcc that supplies a +5 (V) voltage for a power supply of the interface circuit 36, a diode D1 that is connected in parallel and mutually in series with the condenser C2, and resistors R4, R5 for voltage division, which are connected in parallel and mutually in series with the condenser C2 and the primary winding m2 that functions as a voltage generation portion for feedback. A feedback terminal FB of the switching control circuit 29 is connected between the resistors R4, R5. Note that the resistors R4, R5 constitute a voltage division portion 39.

In addition, the +5 (V) control voltage is generated by the primary side winding m2 and supplied to the power supply Vcc in accordance with the generation of the U-phase, V-phase, W-phase, X-phase, Y-phase, and Z-phase +15 (V) output voltages. Furthermore, the control voltage is supplied to the feedback terminal FB of the switching control circuit 29 as a voltage for feedback, in other words a feedback voltage. Note that in the design of the switching control circuit 29, the control voltage is divided by the voltage division portion 39, and a +2 (V) voltage is supplied to the feedback terminal FB as the feedback voltage.

If an output voltage higher than +15 (V) is generated on the secondary side of the transformer 27, a control voltage higher than +5 (V) is generated in the primary winding m2. The control voltage is divided by the voltage division portion 39 and a feedback voltage higher than +2 (V) is supplied to the switching control circuit 29. In addition, if a feedback voltage higher than +2 (V) is supplied to the switching control circuit 29, the duty control portion 61 makes the duty of the duty signal SD smaller, reducing the output voltage generated on the secondary side of the transformer 27.

Furthermore, if an output voltage lower than +15 (V) is generated on the secondary side of the transformer 27, a control voltage lower than +5 (V) is generated in the primary winding m2. The control voltage is divided by the voltage division portion 39 and a feedback voltage lower than +2 (V) is supplied to the switching control circuit 29. In addition, if a feedback voltage lower than +2 (V) is supplied to the switching control circuit 29, the duty control portion 61 makes the duty of the duty signal SD larger, increasing the output voltage generated on the secondary side of the transformer 27. In this way, the output voltage generated on the secondary side of the transformer 27 can be maintained at +15 (V). Note that in the switching control circuit 29, GND denotes a ground connection, REF denotes a reference terminal, and RC denotes a reset terminal. The U-phase power supply circuit 44, the V-phase power supply circuit 45, the W-phase power supply circuit 46, the X-phase power supply circuit 47, the Y-phase power supply circuit 48, and the Z-phase power supply circuit 49 smooth the output voltages that are generated between each terminal of the respective secondary side windings m3 to m8, and have smoothing circuits 50 that generate U-phase, V-phase, W-phase, X-phase, Y-phase and Z-phase +15 (V) output voltages, and overvoltage detection circuits 52 that are connected to each smoothing circuit 50 and detect an overvoltage when an overvoltage is generated in the U-phase power supply circuit 44, the V-phase power supply circuit 45, the W-phase power supply circuit 46, the X-phase power supply circuit 47, the Y-phase power supply circuit 48, or the Z-phase power supply circuit 49.

Each of the smoothing circuits 50 includes a diode D2 and a condenser C3 that are connected in series between each terminal of the secondary side windings m3 to m8. A +15 (V) output voltage is generated at a terminal t21 between the diode D2 and the condenser C3, and a terminal t22 between the condenser C3 and the secondary windings m3 to m7 is grounded.

Furthermore, each overvoltage detection circuit 52 includes resistors R6, R7 that are connected in series between the terminals t21, t22, and resistors R8, R9 and a shunt regulator IC, which serves as an overvoltage detection element, that are connected in parallel and mutually in series with the resistors R6, R7. A photo diode PD is connected in parallel with the resistor R9. In addition, a reference terminal of the shunt regulator IC is connected between the resistors R6, R7.

If the output voltage generated at the terminal t21 in the U-phase power supply circuit 44, the V-phase power supply circuit 45, the W-phase power supply circuit 46, the X-phase power supply circuit 47, the Y-phase power supply circuit 48, or the Z-phase power supply circuit 49 increases, generating an overvoltage, the output voltage is divided by the resistors R6, R7, and the voltage applied to the reference terminal of the shunt regulator IC increases. The shunt regulator IC increases the current flowing between the cathode and the anode, increasing the current flowing through the photo diode, and causing a quantity of light to be emitted corresponding to the current. Note that according to this embodiment, the overvoltage detection circuit 52 detects an overvoltage based on the voltage between the resistors R6, R7, sends the voltage to the shunt regulator IC as a detection signal, and applies the voltage to the reference terminal.

Furthermore, a fail detection circuit 53, which includes the photo-diode PD and a photo-transistor PT constitutes a photo-coupler.

In addition, as shown in FIG. 5, the interface circuit 36 has resistors R11, R12 that are connected to the photo transistor PT and are connected mutually in series between the emitter of the photo transistor PT and the ground, a transistor Tr11, in which the base is connected between the resistors R11, R12, an overvoltage signal terminal t23 is connected to the collector and the emitter is grounded, a resistor R10 that is connected between the power supply Vcc and the output terminal t14, and a transistor Tr10, in which the base is connected between the resistors R11, R12, the collector is connected between the resistor R10 and the output terminal t14 and the emitter is grounded.

If an abnormality is generated, for example, in the switching control circuit 29, the feedback circuit 35 or the like in the power supply circuit portion 21 with the structure as described above, an output voltage of a predetermined phase power supply circuit among the U-phase power supply circuit 44, the V-phase power supply circuit 45, the W-phase power supply circuit 46, the X-phase power supply circuit 47, the Y-phase power supply circuit 48, or the Z-phase power supply circuit 49 increases, becoming equal with an overvoltage detection level that indicates a pre-set threshold value, and generating an overvoltage, then the overvoltage is detected by the overvoltage detection circuit 52, divided by the resistors R6, R7 and the voltage applied to the reference terminal becomes higher than a set value.

In this way, in the fail detection circuit 53 of the predetermined phase power supply circuit, the current flowing in the photo-diode PD exceeds the threshold value, the photo-transistor PT is set to ON, the power supply Vcc connects to the collector, generating a predetermined voltage between the resistors R11, R12. As a result, if the transistors Tr10, Tr11 are set to ON and the output terminal t14 and the overvoltage signal terminal t23 are grounded, a READY signal, that is generated in the output terminal t14 to be sent to the drive motor control device 23, and an overvoltage signal SG1, that is generated in the overvoltage signal terminal t23 to be sent to the switching control circuit 29, become low level. Furthermore, if the transistors Tr10, Tr11 are set to OFF and the output terminal t14 and the overvoltage signal terminal t23 are not grounded, a READY signal that is generated in the output terminal t14 becomes high level, and the overvoltage signal terminal t23 gains a high impedance. Note that the interface circuit 36 constitutes an overvoltage signal generation portion.

In addition, the switching control circuit 29 includes an error amplifier AM that is connected to the feedback terminal FB. When the overvoltage signal SG1 is received by a comparative output terminal COMP that is connected to the overvoltage signal terminal t23, the output of the error amplifier AM becomes low level. As a result, an output voltage suppression processing unit (not shown in the diagrams) of the duty control portion 61 carries out output voltage suppression processing to control immediately the duty of the duty signal SD so that it becomes small, and suppresses an increase in the output voltage generated on the secondary side of the transformer 27. In addition, the output voltage proceeds to find a constant value at approximately the overvoltage detection level. In the meantime, the READY signal alternates between a high level and a low level, generating hunting. Note that a resistor R15 and a condenser C5, which are mutually connected in parallel, are connected between the comparative output terminal COMP and the feedback terminal FB.

In addition, while the output voltage continues to find a constant value at approximately the overvoltage detection level, the drive motor control device 23 determines that the READY signal is at a low level and interrupts a circuit that supplies the ignition voltage to the power supply circuit portion 21, stopping the operation of the power supply circuit portion 21.

In this way, if an overvoltage is generated in the predetermined phase power supply circuit and is detected by the overvoltage detection circuit 52, an overvoltage signal SG1 is generated in the interface circuit 36 and control is executed in the duty control portion 61 such that the duty of the duty signal SD becomes smaller. Therefore, because the output voltage does not become higher than an overvoltage detection level and does not exceed a gate withstand voltage of the IPM 22 in the period of time between the overvoltage detection circuit 52 detecting the overvoltage and the operation of the power supply circuit portion 21 being stopped, fracturing of the IPM 22, especially the transistors Tr1 to Tr6, the drive circuit 51 and the like, can be prevented.

Hereafter, the flowchart will be explained.

In Step S1, the output voltage becomes high. If the output voltage becomes equal to the overvoltage detection level, in step S2, the overvoltage detection circuit detects the overvoltage and the overvoltage signal SG1 is sent in step S3. Then, in step S4, the duty ratio of the duty signal SD is made smaller and an increase in the output voltage is suppressed in step 5. In step S6, a judgment is carried out as to whether the output voltage is higher than the overvoltage detection level. If the output voltage is higher than the overvoltage detection level (Y), the process returns to Step S1. If the output voltage is lower than the overvoltage detection level (N), the process ends.

Hereafter, a second embodiment of the invention will be explained. Note that because the same symbols are attributed to items that are structured in the same manner as in the first embodiment, an explanation regarding these items is omitted.

Figure 7:
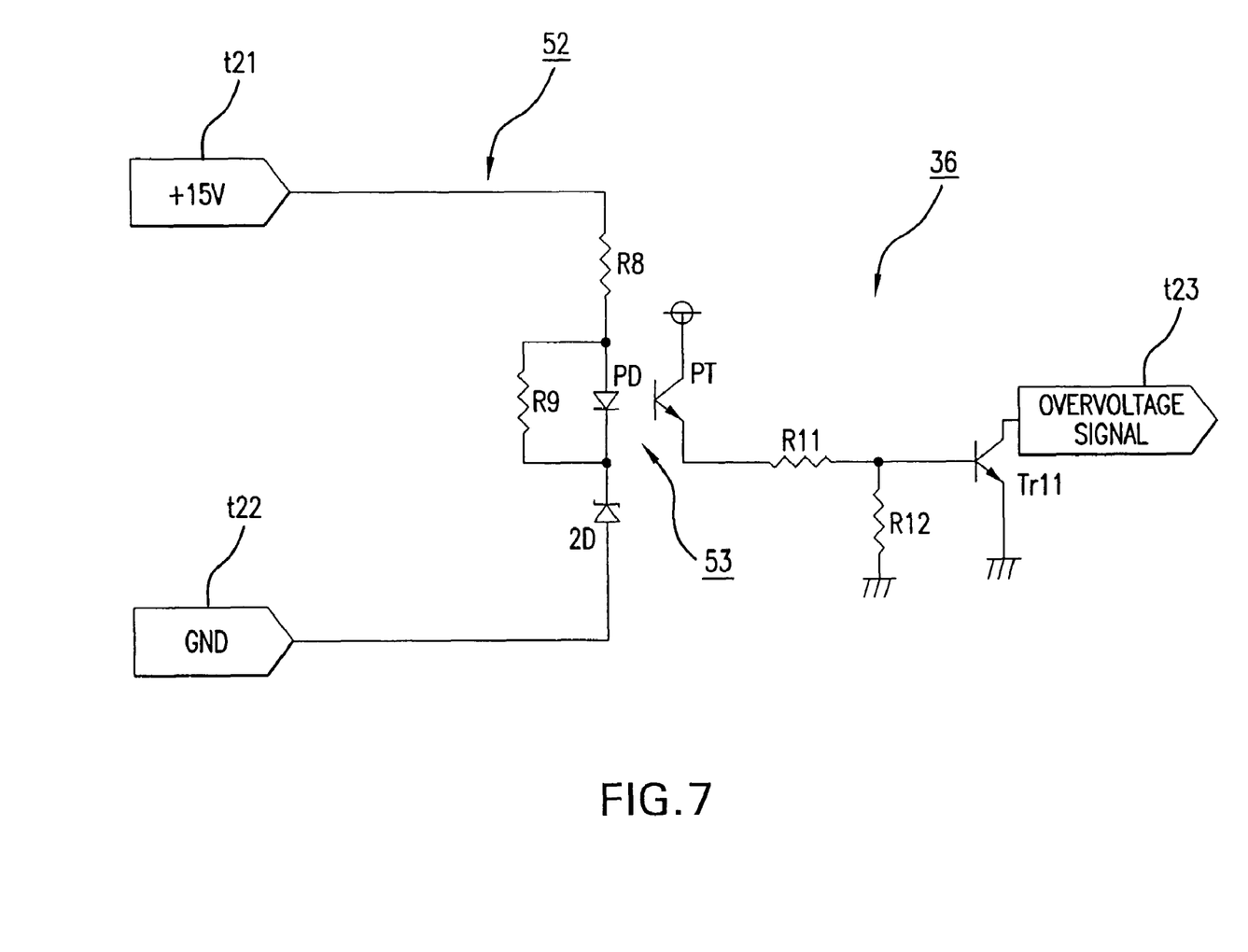
FIG. 7 is a diagram showing a main part of a power supply circuit portion according to a second embodiment of the invention.

FIG. 7 is a diagram showing a main part of a power supply circuit portion according to the second embodiment of the invention. In this case, a Zener diode ZD is used as an overvoltage detection element instead of the shunt regulator IC (see FIG. 5) according to the first embodiment. Therefore, if the output voltage of the terminal t21 becomes higher than the overvoltage detection value in the predetermined phase power supply circuit, generating an overvoltage, then the Zener diode ZD breaks down, a current flows between the cathode and anode, and the photo diode PD is caused to emit a quantity of light corresponding to the current. According to this embodiment, the overvoltage detection circuit 52 detects the overvoltage based on the output voltage of the terminal t21, and sends the output voltage to the Zener diode ZD as a detection signal.

Note that the invention is not limited to the aforementioned embodiments, and various modifications based on the purpose of the invention are possible, which are regarded as within the scope of the invention.

What is claimed is:

1. A power supply device for driving a motor which comprises a switching control circuit on a primary side of a transformer, which switches a switching element for a power source, an output voltage generation portion on a secondary side of the transformer, which generates a predetermined output voltage in accordance with the switching of the switching element for the power source, and a fail detection circuit, wherein the output voltage generation portion includes an overvoltage detection circuit that detects an overvoltage;

the overvoltage detection circuit is connected to the fail detection circuit;

the fail detection circuit generates a voltage when the overvoltage detection circuit detects the overvoltage;

the fail detection circuit is connected to an output terminal that outputs a normal operation signal to a drive motor control device and to an overvoltage signal terminal that outputs an overvoltage signal to the switching control circuit; and the switching control circuit includes an output voltage suppression processing unit that suppresses an increase in the output voltage when the overvoltage is detected.

2. The power supply device for driving the motor according to claim 1, wherein the output voltage generation portion includes a plurality of phase power supply circuits that generate a plurality of output voltages, and the overvoltage detection circuit is provided in each phase power supply circuit.

3. The power supply device for driving the motor according to claim 1, wherein the switching control circuit includes a duty control portion that switches the switching element for the power source according to a predetermined duty signal, and the output voltage suppression processing unit is provided in the duty control portion and executes control such that the duty ratio of the duty signal becomes smaller when the overvoltage is detected.

4. The power supply device for driving the motor according to claim 2, wherein the switching control circuit includes a duty control portion that switches the switching element for the power source according to a predetermined duty signal, and the output voltage suppression processing unit is provided in the duty control portion and executes control such that the duty ratio of the duty signal becomes smaller when the overvoltage is detected.

5. The power supply device for driving the motor according to claim 1, comprising an overvoltage signal generation portion that generates the overvoltage signal when the overvoltage is detected, and sends the overvoltage signal to the switching control circuit.

6. The power supply device for driving the motor according to claim 2, comprising an overvoltage signal generation portion that generates the overvoltage signal when the overvoltage is detected, and sends the overvoltage signal to the switching control circuit.

7. The power supply device for driving the motor according to claim 3, comprising an overvoltage signal generation portion that generates the overvoltage signal when the overvoltage is detected, and sends the overvoltage signal to the switching control circuit.

8. The power supply device for driving the motor according to claim 4, comprising an overvoltage signal generation portion that generates the overvoltage signal when the overvoltage is detected, and sends the overvoltage signal to the switching control circuit.

9. The power supply device for driving the motor according to claim 1, wherein the fail detection circuit includes a photo-diode and a photo-transistor constituting a photo-coupler.

* * * * *